US010613228B2

(12) United States Patent
Fenton et al.

(10) Patent No.: US 10,613,228 B2
(45) Date of Patent: Apr. 7, 2020

(54) TIME-OF-FLIGHT AUGMENTED STRUCTURED LIGHT RANGE-SENSOR

(71) Applicant: MICROSOFT TECHNOLOGY LICENSING, LLC, Redmond, WA (US)

(72) Inventors: Michael S. Fenton, Palo Alto, CA (US); John P. Godbaz, Mountain View, CA (US)

(73) Assignee: Microsoft Techology Licensing, LLC, Redmond, WA (US)

( * ) Notice: Subject to any disclaimer, the term of this patent is extended or adjusted under 35 U.S.C. 154(b) by 0 days.

(21) Appl. No.: 15/698,728

(22) Filed: Sep. 8, 2017

(65) Prior Publication Data

US 2019/0079192 A1 Mar. 14, 2019

(51) Int. Cl.
*G01S 17/89* (2020.01)
*G01S 17/42* (2006.01)
*G01S 7/497* (2006.01)
*G01S 17/48* (2006.01)
*G01S 17/36* (2006.01)
(Continued)

(52) U.S. Cl.
CPC ............ *G01S 17/89* (2013.01); *G01S 7/4865* (2013.01); *G01S 7/4876* (2013.01); *G01S 7/4972* (2013.01); *G01S 17/10* (2013.01); *G01S 17/36* (2013.01); *G01S 17/42* (2013.01); *G01S 17/48* (2013.01)

(58) Field of Classification Search
CPC ....... G01S 17/89; G01S 7/4865; G01S 7/4876
See application file for complete search history.

(56) References Cited

U.S. PATENT DOCUMENTS 8,803,967 B2 8/2014 Oggier et al.
9,280,829 B1 3/2016 Lewis et al.
(Continued)

FOREIGN PATENT DOCUMENTS

WO 2016076796 A1 5/2016

OTHER PUBLICATIONS

Zhu, et al., "Reliability Fusion of Time-of-Flight Depth and Stereo Geometry for High Quality Depth Maps", In Journal of IEEE Transactions on Pattern Analysis and Machine Intelligence, vol. 33, No. 7, Jul. 2011, pp. 1400-1414.
(Continued)

*Primary Examiner* — Hugh Maupin
(74) *Attorney, Agent, or Firm* — Shook, Hardy & Bacon LLP

(57) ABSTRACT

The technology described herein is a depth camera that uses structured light and modulated light to produce a depth image. The modulated and structured light allows a time-of-flight depth to be calculated for each unit (e.g., a single dot) of the reflected structured light image captured by the depth camera's image sensor. The time-of-flight depth can be used to accurately identify each unit of the reflected structured light image. Once each unit of the reflected structured light image is identified, a structured light triangulation algorithm can be used to calculate a depth for each unit of the reflected structured light image. The present technology also allows a confidence score to be generated for the assigned depths within the depth image by comparing the structured light depth for each unit to the TOF depth for each unit.

20 Claims, 9 Drawing Sheets

(51) Int. Cl.
*G01S 7/4865* (2020.01)
*G01S 7/487* (2006.01)
*G01S 17/10* (2020.01)

(56) References Cited

U.S. PATENT DOCUMENTS

| | | | |
|---|---|---|---|
| 9,329,035 | B2 | 5/2016 | Oggier |
| 9,330,464 | B1 | 5/2016 | Ackerman et al. |
| 9,947,099 | B2 | 4/2018 | Bleyer et al. |
| 2006/0017720 | A1 | 1/2006 | Li |
| 2009/0059011 | A1 | 3/2009 | Sun et al. |
| 2010/0074532 | A1* | 3/2010 | Gordon .................. G01B 11/25 382/203 |
| 2011/0025843 | A1 | 2/2011 | Oggier et al. |
| 2012/0056982 | A1 | 3/2012 | Katz et al. |
| 2015/0062558 | A1 | 3/2015 | Koppal et al. |
| 2015/0292876 | A1 | 10/2015 | Pettersson et al. |
| 2015/0319347 | A1 | 11/2015 | Cottrell |
| 2016/0006914 | A1* | 1/2016 | Neumann ............. G06F 3/0325 348/78 |
| 2016/0109575 | A1 | 4/2016 | Oggier et al. |
| 2016/0266647 | A1 | 9/2016 | Leheup |
| 2017/0097417 | A1 | 4/2017 | Wang |
| 2017/0163969 | A1 | 6/2017 | Cronie |
| 2017/0243374 | A1 | 8/2017 | Matsuzawa |
| 2017/0272651 | A1* | 9/2017 | Mathy ................ H04N 5/23241 |
| 2017/0329012 | A1 | 11/2017 | Buttgen et al. |
| 2018/0033146 | A1 | 2/2018 | Bleyer et al. |
| 2018/0211398 | A1* | 7/2018 | Schmidt .................. G06T 7/514 |
| 2018/0275278 | A1 | 9/2018 | Yamada |
| 2019/0339369 | A1 | 11/2019 | Fenton et al. |

OTHER PUBLICATIONS

"International Search Report and Written Opinion Issued in PCT Application No. PCT/US18/038878", dated Sep. 21, 2018, 14 Pages.

"Non-Final Office Action Issued in U.S. Appl. No. 15/971,765", dated Sep. 30, 2019, 9 Pages.

Chen, et al., "Accurate Calibration for a Camera-Projector Measurement System based on Structured Light Projection", In Journal of Optics and Lasers in Engineering, vol. 47, Mar. 1, 2009, pp. 310-319.

Foix, et al., "Lock-in Time-of-Flight (ToF) Cameras: A Survey", In IEEE Sensors Journal, vol. 11, Issue 9, Jan. 13, 2011, pp. 1917-1926.

Kahlmann, et al., "Calibration for Increased Accuracy of the Range Imaging Camera Swissranger", In Journal of Image Engineering and Vision Metrology, vol. 36, Issue 3, Sep. 2006, pp. 136-141.

Li, et al., "Novel Calibration Method for Structured-Light System with an Out-of-Focus Projector", In Journal of Optical Society of America, Applied Optics, vol. 53, Issue 16, Jun. 1, 2014, pp. 3415-3426.

Moreno, et al., "Simple, Accurate, and Robust Projector-Camera Calibration", In Proceedings of Second International Conference on 3D Imaging, Modeling, Processing, Visualization & Transmission, Oct. 13, 2012, pp. 464-471.

Decker, et al., "Performance Evaluation and Clinical Applications of 3D Plenoptic Cameras", In Proceedings of International Society for Optics and Photonics, vol. 9494, Next-Generation Robotics II; and Machine Intelligence and Bio-inspired Computation: Theory and Applications IX, 94940B, Jun. 18, 2015, 11 Pages.

"International Search Report and Written Opinion Issued in PCT Application No. PCT/US19/029253", dated Aug. 9, 2019, 12 Pages.

* cited by examiner

TIME-OF-FLIGHT AUGMENTED STRUCTURED LIGHT RANGE-SENSOR

BACKGROUND

One of the features of machine vision systems can be the ability to recognize a scene and identify features and objects in the scene. Machine vision systems can be used in portable devices, such as head-mounted devices, on industrial robots, driverless cars, and other devices. Over time, the performance of such systems can degrade. The degradation can be difficult to detect so long as the vision system is still generating a depth image. For example, it is difficult to determine whether the assigned depths are accurate.

Different types of depth camera technology exist. Time-of-flight (TOF) can be used to produce range images at any distance, but suffers from errors due to multipath and other factors. Active triangulation/structured illumination on its own is able to produce range images that do not suffer from multipath and are thus more suitable for applications such as object capture (which requires high accuracy). However, the active triangulation/structured illumination sensor can suffer performance problems if either the pattern or optics change over time (e.g., due to physical shock).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein is a depth camera that uses structured light and modulated light to produce a depth image. The modulated and structured light allows a time-of-flight (TOF) depth to be calculated for each unit (e.g., a single dot) of the reflected structured light image captured by the depth camera. The time-of-flight depth can be used to accurately identify each unit of the reflected structured light image. Once each unit of the reflected structured light image is identified, a structured light triangulation algorithm can be used to calculate a depth for each unit of the reflected structured light image. This can result in a denser or more granular depth image since each unit of the image is assigned a depth.

The present technology also allows a confidence score to be generated for the assigned depths within the depth image. The structured light depth for each unit of the reflected structured light image can be compared to the TOF depth to calculate a confidence score for each unit of the reflected structured light image. The confidence score can be passed to an application along with the depth map and used to confirm whether actions should or should not be taken based on the depth map. For example, a driverless car may choose not to attempt parking in a location if the depth of surrounding objects is uncertain or give more weight to other types of data available to make a decision. The confidence score can also be evaluated over time to assess the performance of the depth camera. Consistent differences between the structured light depth and the TOF depth can indicate a problem.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
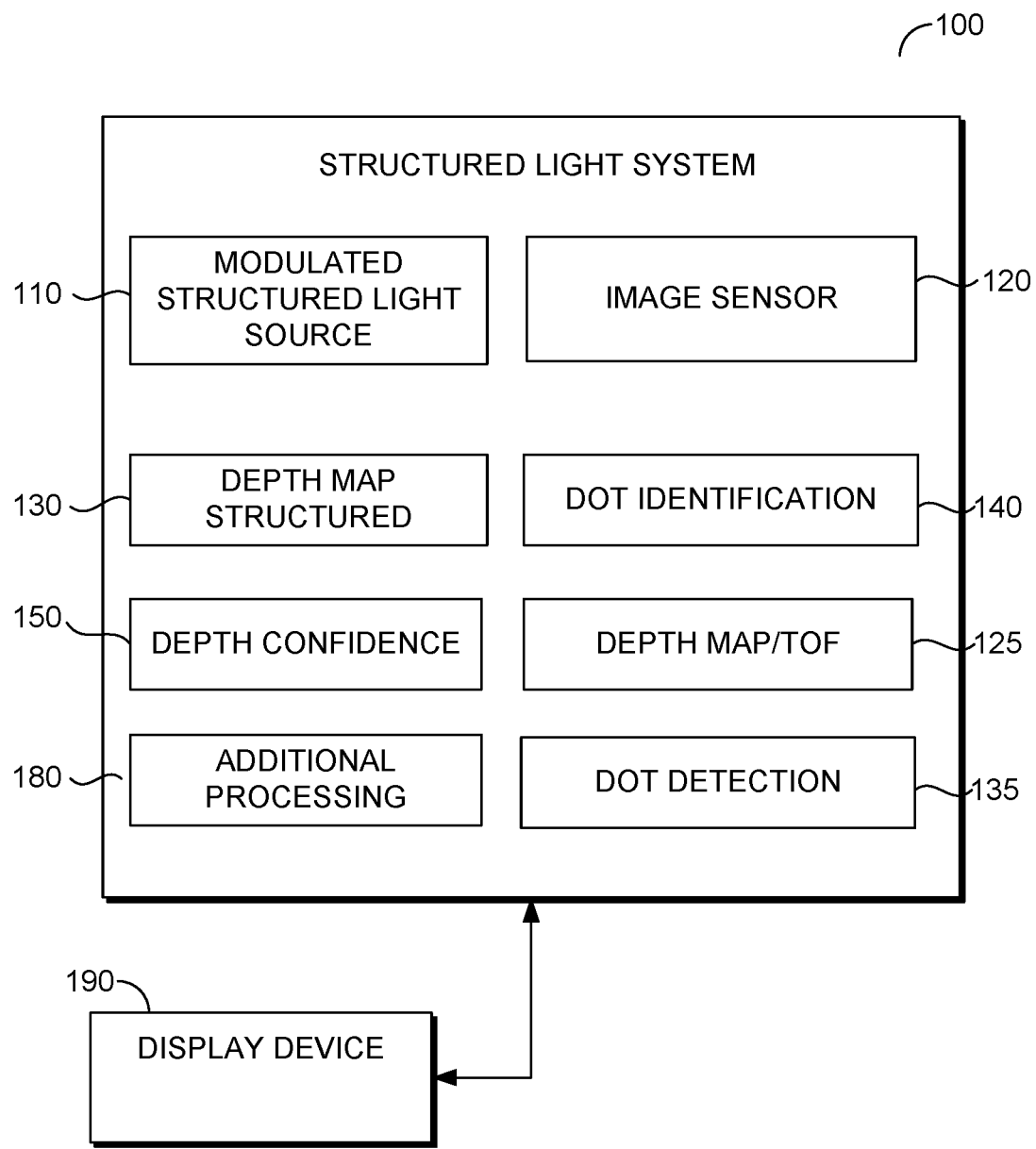
FIG. 1 is a block diagram of an example structured light system, in accordance with an aspect of the technology described herein.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein is a depth camera that uses structured light and modulated light to produce a depth image. The modulated and structured light allows a time-of-flight (TOF) depth to be calculated for each unit (e.g., a single dot) of the reflected structured light image captured by the depth camera. The TOF depth can be used to accurately identify each unit of the reflected structured light image. Once each unit of the reflected structured light image is identified, a structured light triangulation algorithm can be used to calculate a depth for each unit of the reflected structured light image. This can result in a denser or more granular depth image since each unit of the image is assigned a depth.

In contrast, current structured light technology typically evaluates clusters of units together, resulting in a dependence on the distribution of the illumination pattern and therefore imposing constraints on said pattern. The technology described herein reduces this dependence and is largely invariant to the distribution. As will be explained in more detail, current technology typically uses a randomized pattern of units within a projected structured light image. The randomized pattern is needed to determine which part of the reflected image corresponds to part of the projected image. A unique pattern of units within a cluster of the reflected image needs to be evaluated together to accurately identify a correspondence with the projected image. The randomization is needed to make each cluster unique. The present technology eliminates the need to evaluate units as a cluster and allows for non-random structured light patterns, such as a grid of dots, to be used. However, the technology described herein also works with a randomized pattern.

The present technology also allows a confidence score to be generated for the assigned depths within the depth image. The structured light depth for each unit of the reflected structured light image can be compared to the TOF depth to calculate a confidence score for each unit of the reflected structured light image. The confidence score can be passed to a consuming application along with the depth map and used to confirm whether actions should or should not be taken based on the depth map. For example, a driverless car may choose not to attempt parking in a location if the depth of surrounding objects is uncertain or give more weight to other types of data available to make a decision. The confidence score can also be evaluated over time to assess the performance of the depth camera. Consistent differences between the structured light depth and the TOF depth can indicate a problem and trigger a corresponding event handler such as recalibration or a notice to the operator.

The depth image may comprise a number of pixels with a depth value for each pixel. The depth value for each pixel corresponds with a distance between a point on an object in the area being viewed by the depth camera and a reference position.

The initial structured time-of-flight image produced by the technology described herein comprises x-y coordinates for the reflected structured light. A z-depth value for each pixel that received the structured-modulated light can be calculated by measuring the modulation change in the light using TOF methodology. In aspects, some pixels may not capture structured-modulated light. A typical structured light image would only include the measured intensity profile of the reflected structured light, without depth data. In typical time-of-flight 3D imaging, a scene is uniformly illuminated by a modulated signal and the sensor records the round trip time of the photons from the illuminator to the sensor. During operation, a depth map can be generated by capturing a plurality of high frequency time or phase-shifted images. By providing continuous illumination to the sensor pixels and by capturing time or phase information, a time-of-flight imaging system can allow for calculation of a depth map. Due to the nature of how the depth map is determined based on phase information in a time-of-flight 3D imaging system, multipath interference in images captured by the time-of-flight 3D imaging system can result in non-rigid deformations and/or distortions. Typical TOF systems flood the scene with continuous light that has no particular pattern, similar to light emitted by a light bulb. The technology described herein uses a light emitter that outputs continuous modulated light, but with a structured light pattern. The modulated characteristic of the light allows the round trip distance to be calculated.

A structured light image is the reflection of a structured light pattern off objects in the scene. The depth map can be determined by capturing the structured light image and then using a triangulation method to determine a depth profile (i.e., depth map) based on the observed relative translation of known features of the structured illumination in the captured structured light image as scaled by the estimated baseline from the illuminator (light emitter) to the sensor.

In this discussion, a structured light image corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). A depth map can be determined based on a structured light image by, for example, triangulation. One option for triangulation can be to have at least two cameras with overlapping fields of view for detecting the structured light image with known distance relationships between the at least two cameras. Another option can be to have a known distance relationship between the structured light source and a single camera for capturing the structured light image. In this type of option, the known offset between the structured light source and the camera can be used in combination with a predetermined reference pattern projected by the structured light source to allow the light source to be used as a "virtual camera" for purposes of triangulation.

In various aspects, the number of units projected by a structured light source can be substantially smaller than the number of pixels used to represent an environment. As a result, the number of pixels illuminated by a dot from a structured light source can be substantially less than the total number of pixels. This can be in contrast to the light images projected by time-of-flight systems, where the projected illumination can correspond to continuous illumination or a "flood fill" that illuminates all or substantially all of the pixels in a view. For example, for a structured light image based on illumination from a structured light source, the number of pixels that are (at least partially) illuminated by a dot or unit can be 60% or less of the total number of pixels in the field of view corresponding to an environment. Expressed as a ratio, the number of pixels illuminated by a dot versus pixels not illuminated by a dot can be 1.5 or less (i.e., 60% or less of total pixels). More generally, the dots projected by a structured light source can correspond to having a ratio of illuminated pixels to non-illuminated pixels, in a reference direction suitable for defining the nature of a structured light image of the structured light source, of about 1.0 or less, or about 0.5 or less, or about 0.3 or less, or about 0.2 or less. In this discussion, pixels that are illuminated by a dot can be referred to as pixels that cover a dot and/or that are associated with a dot. It is further noted that the dots projected in the structured light image may have overlap with more than one pixel.

In aspects, the technology described herein outputs both a structured light and modulated light through a single light emitter. In this way, the modulated light does not flood the field, but instead follows a ratio consistent with a structured light system and each pixel may not receive modulated light.

The time-of-flight camera may be a phase modulation time-of-flight camera. It comprises a light emitter and an image sensor. The light emitter outputs modulated light. In an example, the source of modulated light may be an incoherent light source, which emits transmitted light that is modulated with a signal at a modulation frequency. In an example, the light from the device may be modulated rapidly, such that the amount of illumination changes periodically.

In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has travelled on the return trip between the sensor and the object. For each pixel of the image sensor, the amplitude and phase difference of the received signal relative to the transmitted light may be determined for each modulation frequency and used to calculate a depth for the pixel.

Unit Detection

A starting point for determining a depth image based on a structured light image can be related to detecting the projected units (e.g., dots) in the structured light image. As mentioned, the light is emitted in a pattern. The ultimate goal is to find a correspondence between the projected light structure and the reflected light structure. In other words, an analysis is performed to determine which emitted units correspond to captured units in the image. The correspondence is used to determine a distance between emitted and received light and used to calculate a depth. A preliminary step is to identify units within the image that can be analyzed for correspondence.

A first step can be to isolate light by frequency to focus the analysis on content within a frequency corresponding to the emitted light. Even within the relevant light frequency, the image can include noise and other content that are not dots. Units, described as dots herein, can be identified by obtaining a binary segmentation of the image such that each pixel is classified as (1) covering a dot or (2) not covering a dot. A pixel covering a dot can also be referred to as a pixel associated with a dot. This can also include determining an intensity profile based on the intensities for each detected dot. With regard to detecting the presence (or absence) of a dot at a pixel, a variety of strategies can be available. One option can be to perform thresholding based on a global threshold value. If the detected intensity at a pixel is greater than the global threshold value, then the pixel is considered to be associated with a dot. Another option is to perform a local or adaptive thresholding for feature detection. Once the dots are isolated from noise in the reflected image, and therefore detected, a TOF z-depth can be calculated for each dot as well as representative horizontal and vertical locations in the image (x and y image coordinates). One approach to determine a representative location is to calculate the centroid of the detected dot, but other methods are also possible.

Dot identification attempts to identify a correspondence between detected dots in the image with projected dots. In an aspect, each unit in the projected image is assigned a unique identification corresponding to an identified unit in the projected image. The TOF z-depth is used to assign a corresponding identity to each observed dot in the image. For simplicity, the following discussion proceeds as if the imaging optics were not subject to radial distortion, such as pincushion or barrel distortion, however distortion correction can utilized in many implementations. In some implementations, optics with minimal radial distortion are used, in other implementations the image may be explicitly resampled/rectified to correct for radial distortion. In another implementation, the x and y image coordinates of each dot are converted into a radial distortion corrected representation before further operations are carried out on the x & y image location values. Any further reference to x or y dot location could be considered to apply to either distortion corrected or uncorrected values depending on the implementation.

Figure 6:
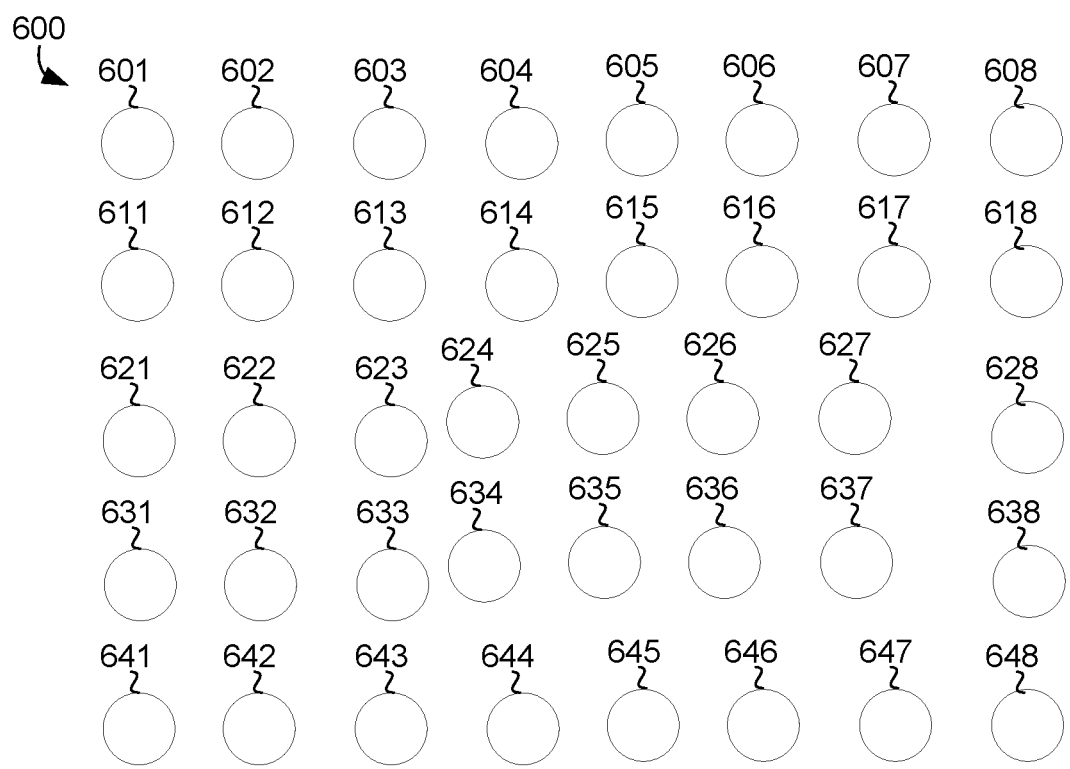
FIG. 6 is a diagram depicting a TOF depth adjusted structured light image, in accordance with an aspect of the technology described herein.

In one aspect, the TOF z-depth is used to generate a TOF-depth adjusted image, such as shown in FIG. 6. The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

$$Y\_ADJUSTED=Y\_DOT \text{ (so this dimension doesn't change)}$$

$$X\_ADJUSTED=X\_DOT-c/Z\_DOT\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and light emitter in a top-to-bottom arrangement along the y-axis, in which case the X_ADJUSTED=X_DOT and Y_ADJUSTED=Y_DOT−c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity.

This process can be repeated for each dot or unit detected, until each unit is repositioned to form the TOF-adjusted structured light image. The TOF-adjusted structured light image can then be used to identify each detected unit. The TOF-adjusted structured light image can be a virtual image or just a list of adjusted coordinates for units detected in the image. The adjusted coordinates can be used to identify units in the image. The actual image is used to calculate the structured light z-depth. The TOF-adjusted structured light image is only used to identify detected units within an image. In one implementation of the technology described herein, each dot is uniquely identified without reference to any neighboring dots in the image by finding the best matching dot in a list of dots or in a reference image in the TOF-adjusted representation. In another implementation, the neighboring dots in either the reference image or the real image are used to assist in identification using their relative locations in the structured light image, the TOF structured light image, or any other parameters calculable from the available data, such as relative intensity of the dots. In one particular variant, the N-nearest matches in the reference image are found and a search is performed by finding the match for each pixel, which minimizes the Lp norm of the difference in Z between the dot and its M-nearest neighbors in the original image. Additional thresholds on the relationship between the TOF data and the estimated range from triangulation or other parameters may be applied at any stage. For example, in one implementation only dots which correspond to range-from-triangulation values that are very near to the TOF deduced range value or closer than the TOF deduced range value are considered to be valid matches, thus reducing the search space and computational complexity. Implementations may use a wide variety of data structures in order to enable fast identification of specific corresponding dots in the reference image, such as quad-trees or decision trees. In some implementations, machine-learning techniques, such as neural networks may be used to accelerate dot identification for either a dot in isolation or over a group of neighboring dots.

Once the identity of each dot has been determined, the structured light z-depth can be calculated. In one implementation of the technology described herein, the structured light z-depth is calculated by Z_STRUCTURE=c/(X_DOT−X_REF), where X_REF is the x-location of the TOF corrected reference at infinity (the dot that X_ADJUSTED value enables us to determine) and Z_STRUCTURE is the determined structured light z-depth.

In some implementations, the structure z-depth data is further denoised/enhanced using the range measurements from TOF. Denoising can improve the image quality subjectively or objectively. The denoise/enhance process may take the form of dynamically determined weights for the purposes of averaging, based upon the difference in z-distance or radial distance between adjacent dots or any other approach that uses features/data from TOF to improve the subjective or objective quality of the structure z-depth image. A specific example is a bilateral filter, where the weights are based upon TOF range data but applied to the z-data generated from structure. A similar filter could be implemented for a sparse image by performing a weighted average of the N-nearest detected dots, either in 3D space or in image space. Some of these filters may also be applied solely using the structure z-depth, without further use of TOF data.

In some implementations, sparse z-depth data for each dot is used as-is, providing output as a list of points in 3D Cartesian space. In additional implementations, the z-depth data is densified to produce dense range data, using methods such including but not limited to: the use of additional non-patterned or uniformly illuminated time-of-flight images or RGB images to enable the synthesis of dense 2D arrays of range data or Cartesian coordinates including range data not explicitly corresponding to an imaged dot. Other densification methods may include interpolation between dots.

FIG. 1 schematically represents an example of a structured light system 100 suitable for determining a depth map from a structured light image. The system shown in FIG. 1 includes a modulated structured light source 110 for projecting a structured light image onto a scene or environment where the projected light is also modulated. In an aspect, the structured light system 100 can have only a single light source and single imaging system. Camera or image sensor 120 can be used to capture the projected structured light image. The captured structured light image can then be processed by one or more components of FIG. 1 in order to generate a depth map. The components shown in FIG. 1 can be implemented, for example, using a processing unit with associated memory that executes computer-executable instructions. More generally, the components shown in FIG. 1 can be implemented using any convenient combination of hardware, firmware, and/or software. For convenience, a plurality of separate components are shown in FIG. 1, but it is understood that these components can be combined and/or split in any convenient manner. The components can include a TOF-depth map calculation component 125, a structured-light depth-map calculation component 130, a dot identification component 140, and a depth confidence factor component 150. Additionally, FIG. 1 shows an additional processing component 180 for performing additional processing based on a depth map. Additional processing component 180 can, for example, correspond to a texture mapping and rendering component. The output from such an additional processing component 180 could be displayed to a user via a display device 190. The display device could correspond to a conventional stand-alone video display, an augmented reality headset (i.e., a head-mounted display device), a display screen on a mobile computing device, a display screen associated with another computing device, and/or any other convenient display device.

The modulated structured light source 110 comprises a light emitter that outputs structured light that is also modulated light. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended. As explained, the modulated light is given a structural arrangement of units that can be organized in a repeating pattern, such as in a grid, or randomized. In FIG. 1, the unit is described as a dot, but other shapes may be used.

Image sensor 120 includes a physical light sensor that can be used to capture the projected structured light image. The image sensor 120 can include software and hardware to generate a digital image of the captured light. The image sensor 120 includes a sensor that can determine a frequency of the received light to be used in a TOF depth determination.

A dot detection component 135 analyzes the image captured by the image sensor 120 to detect dots within the image, as described previously.

A dot identification component 140 attempts to identify a correspondence between detected dots in the image with projected dots. In an aspect, each unit in the projected image is assigned a unique identification corresponding to an identified unit in the projected image. The TOF z-depth is used to assign a corresponding identity to each observed dot in the image.

In one aspect, the TOF z-depth is used to generate a TOF-depth adjusted image, such as shown in FIG. 6. The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

Y_ADJUSTED=Y_DOT (so this dimension doesn't change)

X_ADJUSTED=X_DOT−c/Z_DOT_TOF

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and light emitter in a top-to-bottom arrangement along the y-axis, in which case the X_ADJUSTED=X_DOT and Y_ADJUSTED=Y_DOT−c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity.

This process can be repeated for each dot, or unit, detected until each unit is repositioned to form the TOF-adjusted structured light image. The TOF-adjusted structured light image can then be used to identify each detected unit. The TOF-adjusted structured light image can be a virtual image or just a list of adjusted coordinates for units detected in the image. The adjusted coordinates can be used to identify units in the image. The actual image is used to calculate the structured light z-depth. The TOF-adjusted structured light image is only used to identify detected units within an image.

A TOF-depth map calculation component 125 uses the frequency of the received light to calculate a TOF z-depth for each unit (e.g., dot) identified by the dot identification component 140.

A structured-light depth-map calculation component 130 uses the distance between the emitted light and a dot to determine the depth of an object in the scene using triangulation, as explained in more detail elsewhere.

A depth-confidence-factor component 150 determines a confidence factor for a dot or image. The confidence factor can be computed using the TOF z-depth for a dot and the structured light z-depth for the dot. For example, the confidence factor for a DOT_A could be TOF_Z_DOT_A/SL_Z_DOT_A. In other words, the confidence factor could be the TOF depth divided by the SL depth for a dot. Another implementation could be the difference between the two estimates. The confidence factor for individual dots could be combined to form a confidence factor for the image.

Figure 2:
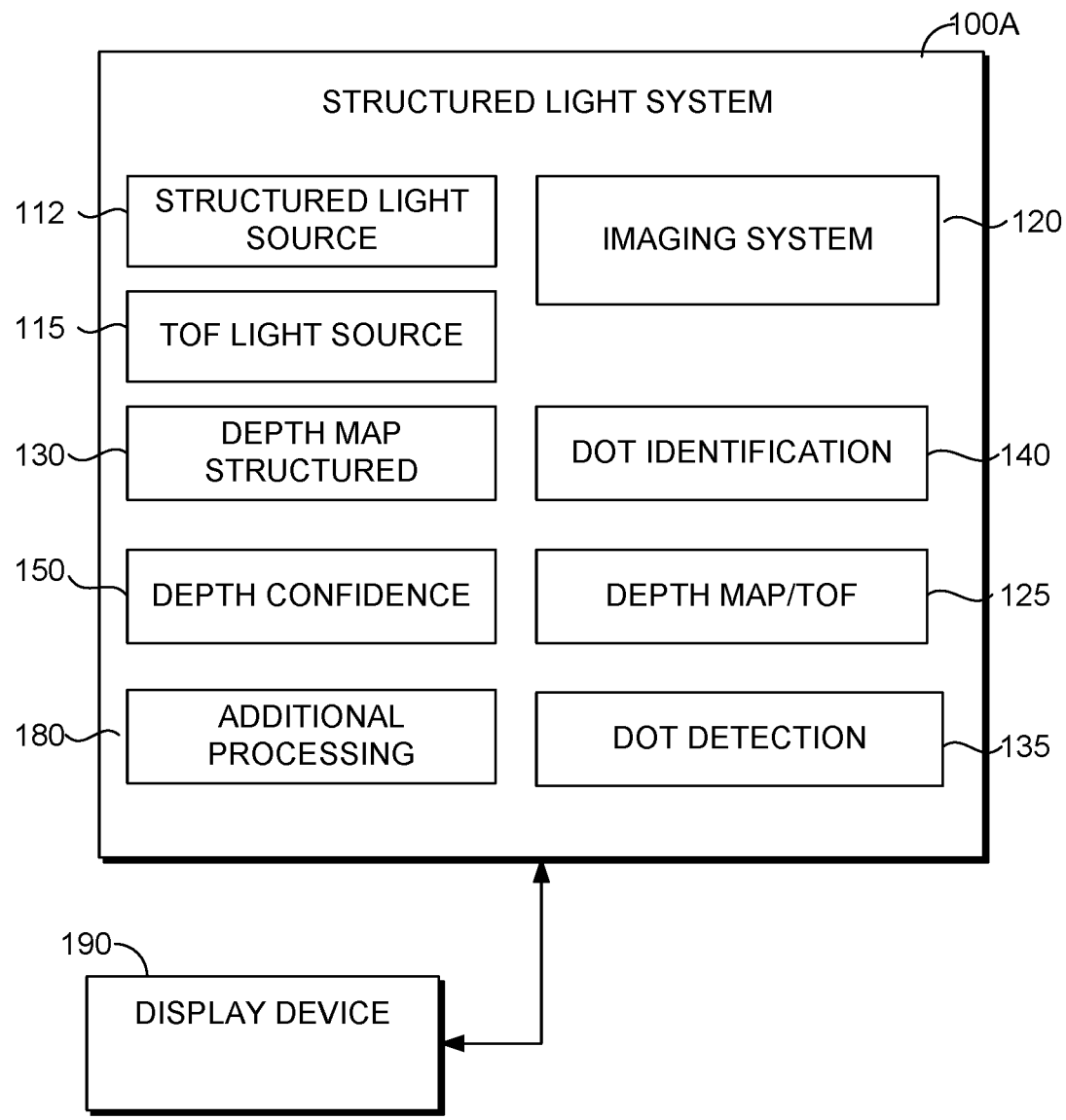
FIG. 2 is a block diagram of an example structured light system, in accordance with an aspect of the technology described herein.

FIG. 2 schematically represents an example of a structured light system 100A suitable for determining a depth map from a structured light image. Structured light system 100A includes the same components of structured light system 100 described with reference to FIG. 1, except that structured light system 100A includes a separate TOF light source 115 and a separate structured light source 112. The TOF light source 115 emits modulated light suitable for TOF depth calculations. The structured light source 112 emits structured light that is not modulated.

Figure 3:
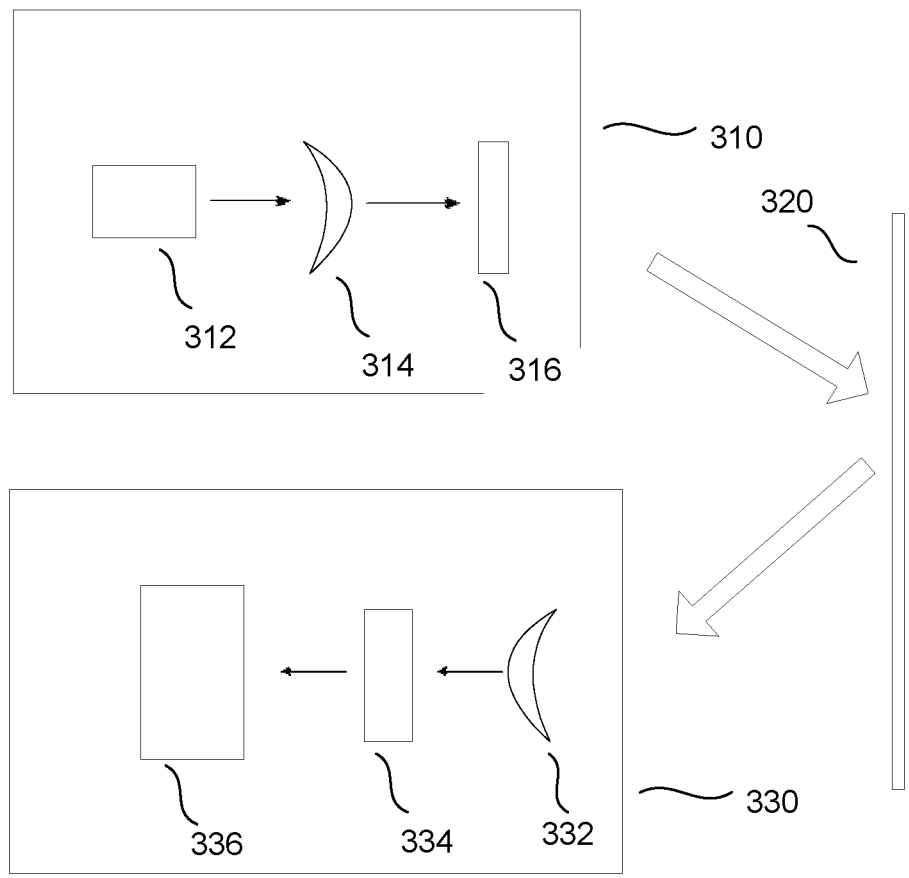
FIG. 3 is a block diagram of an example structured light system, in accordance with an aspect of the technology described herein.

FIG. 3 schematically represents a structured light source 310 and an imaging system 330 that can be used to capture a structured light image. In aspects, the structured light source 310 and imaging system 330 can be part of a single system. In the example of a structured light source shown in FIG. 3, structured light source 310 includes a laser diode 312 (or optionally one or more laser diodes 312), such as a single mode laser diode, for generating modulated light. In one aspect, the laser is a 2.4 W single mode, multi-emitter laser. Other emitters may be used with the technology described herein, such as LEDs. Light from laser diode 312 can then pass through a collimating optic element 314 to provide (substantially) collimated light. The collimated light can then pass through a diffractive optic element 316 to generate light corresponding to a structured light source pattern.

The light from structured light source 310 can be used to project the structured light source pattern onto a view or scene to form a structured light image. The view or scene is schematically represented by surface 320. The structured light image can then be captured by imaging system 330. In the example shown in FIG. 3, imaging system 330 can include an imaging lens 332, one or more filters 334 (such as an IR bandpass filter), and a sensor 336. In one aspect, the imaging sensor has 512×424 usable pixels and is configured with ~35×29 degree field of view, with 8 mm focal length@f/2.0. Aspects are not limited to this imaging sensor.

Figure 4:
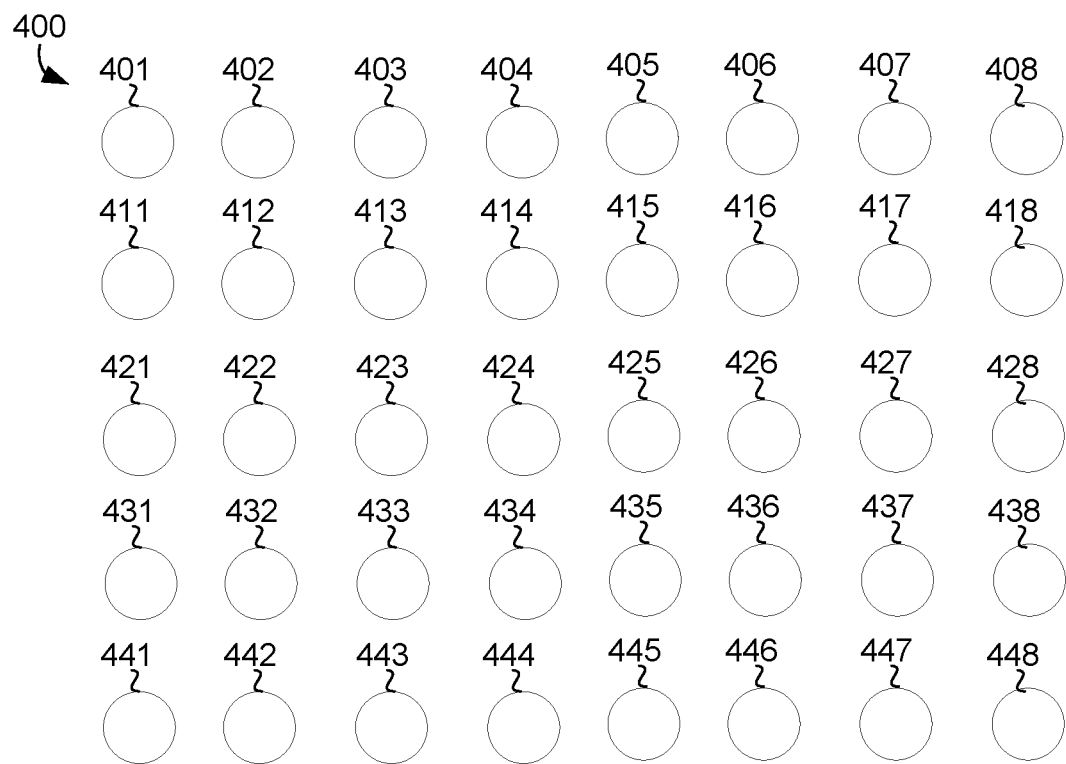
FIG. 4 is a diagram depicting structured illumination reflected off a flat surface, in accordance with an aspect of the technology described herein.

Turning now to FIG. 4, a graphic representation 400 of a reflected structured light image is depicted. The graphic representation 400 represents just a portion of a possible real-world structured light image. An actual structured light image might have many more rows and columns of dots than depicted. Aspects are not limited to a structured light image comprising dots or a grid pattern. Other types of graphical units can be arranged into any number of patterns, including both organized patterns and randomized.

Figure 5:
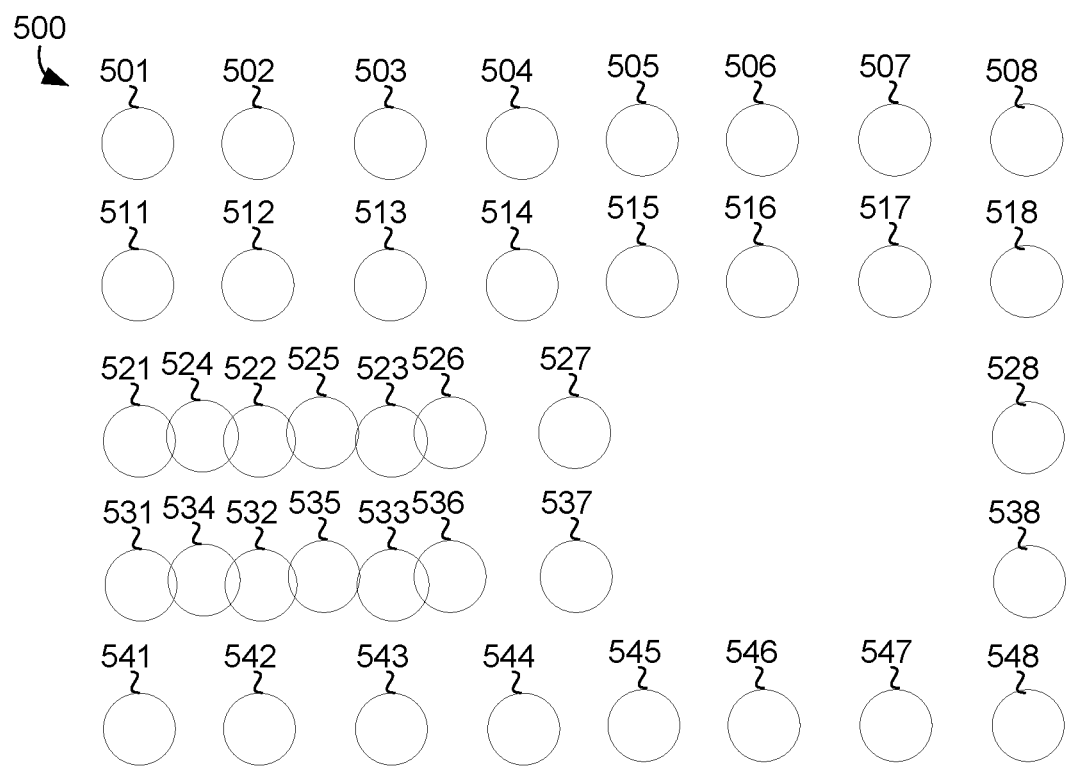
FIG. 5 is a diagram depicting a structured illumination image of a scene with objects at different depths, in accordance with an aspect of the technology described herein.

The orderly arrangement of units within a reflected structured light image depicted could be generated by capturing structured light reflected off of a relatively flat surface because the reflection maintains a similar arrangement as the projected light. As can be seen, the dots are arranged in evenly spaced rows and columns that largely match the projected structure by the image. As shown in FIG. 5, reflected structured light captured off of the scene having objects at different distances causes the dot arrangement to scatter somewhat. The first row of dots comprises dots 401, 402, 403, 404, 405, 406, 407, and 408. The second row of dots comprises dots 411, 412, 413, 414, 415, 416, 417, and 418. The third row of dots comprises dots 421, 422, 423, 424, 425, 426, 427, and 428. The fourth row of dots comprises dots 431, 432, 433, 434, 435, 436, 437, and 438. The fifth row of dots comprises dots 441, 442, 443, 444, 445, 446, 447, and 448.

In aspects of the technology described herein, the reflected light forming each dot can be analyzed to determine a TOF depth for the dot. As mentioned, the TOF depth is calculated by determining the elapsed time taken for the projected light to reflect off an object in the scene and be captured by the imaging sensor.

The TOF depth for each dot can then be used to match the dot in the captured image to a corresponding dot in the projected image. The TOF depth can be used along with other technologies, such as a neighboring dot table, to match projected dots with captured dots. Once dots are identified within the captured image, a distance between the captured dot and the projected dot can be determined using a known offset between the light emitter in the image sensor. The distance between these corresponding dots can be used as part of a triangulation calculation to determine a structured light depth for the dot. In this way, each dot in the captured image can be assigned a structured light depth.

Turning now to FIG. 5, a graphic representation 500 of a reflected structured light image is depicted. The graphic representation 500 shows a reflection off a scene comprising objects at different depths as indicated by the nonconformity with the projected structured light image. The graphic representation 500 demonstrates that determining which dots in an image correspond to which dots in a projected light structure can be complex problem.

The first row of dots comprises dots 501, 502, 503, 505, 505, 506, 507, and 508. The second row of dots comprises dots 511, 512, 513, 514, 515, 516, 517, and 518. The third row of dots comprises dots 521, 522, 523, 524, 525, 526, 527, and 528. Notice that dots 524, 525, 526, and 527 are located to the left of a projected location and are no longer in a row or column. This type of shift can be the result of reflecting off an object in the scene located closer to the imaging sensor than a surface off which the other dots reflected. This type of arrangement is more typical and can make it difficult to determine which dots in an image correspond to which projected dots. The dots 524, 525, 526, and 527 would be assigned a TOF depth that differentiates them from dots 521, 522, 523, and 528 and helps to determine a correspondence with projected dots. The fourth row of dots comprises dots 531, 532, 533, 534, 535, 536, 537, and 538. As with the third row, dots 534, 535, 536, and 537 are not located in their original row and column locations. The fifth row of dots comprises dots 541, 542, 543, 544, 545, 546, 547, and 548.

Turning now to FIG. 6, a graphic representation 600 of a TOF depth-adjusted structured light image is depicted. The graphic representation 600 shows structured light units repositioned in the x-y plane by making an adjustment using TOF depth. The graphic representation 600 demonstrates that using the TOF depth to reposition structured light units makes it easier to correlate observed units with projected units.

The first row of dots comprises dots 601, 602, 603, 604, 605, 606, 607, and 608. The second row of dots comprises dots 611, 612, 613, 614, 615, 616, 617, and 618. The third row of dots comprises dots 621, 622, 623, 624, 625, 626, 627, and 628. Notice that dots 624, 625, 626, and 627 do not quite form a straight row with the other dots in the row. The TOF may not be entirely accurate and using the TOF depth to adjust the x-y value can result in a TOF-depth adjusted image that does not exactly match the projected image. The difference can result from a slight error in the TOF depth calculation, a radial distortion correction, or a calculation of the representative dot location. The fourth row of dots comprises dots 631, 632, 633, 634, 635, 636, 637, and 638. As with the third row, dots 634, 635, 636, and 637 are not located in their original row and column locations. The fifth row of dots comprises dots 641, 642, 643, 644, 645, 646, 647, and 648. The result is an arrangement of dots that are much easier to correlate with the projected structured light image. The TOF-adjusted structured light image does not need to be displayed. In an aspect, only the TOF-adjusted structured light coordinates are used to identify dots in the reflected image. For example, the TOF-adjusted structured light coordinates for a dot can be used rather than the image-based coordinates within a neighboring dot table, typically used with a randomized pattern, to identify individual dots.

Figure 7:
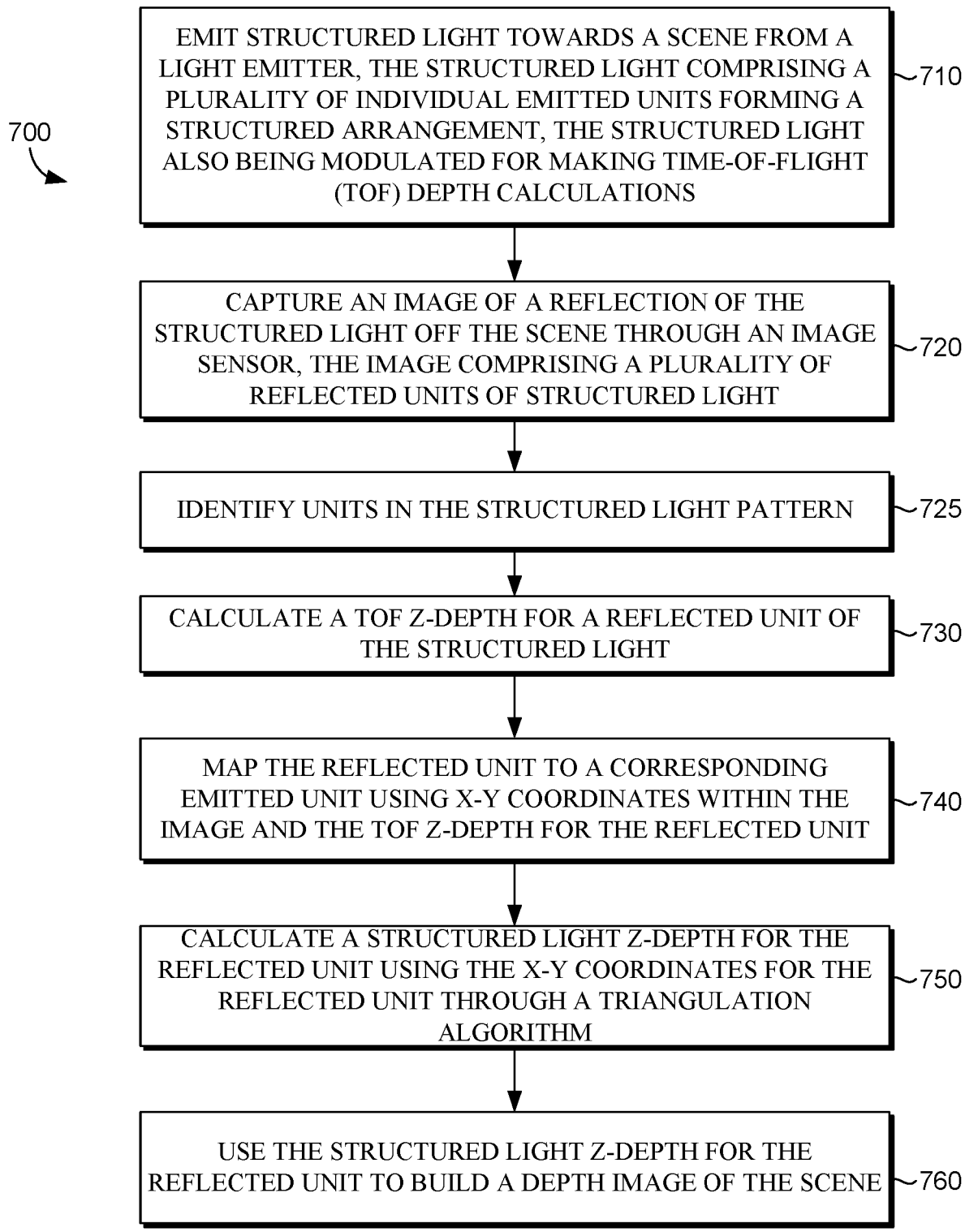
FIGS. 7-8 are flow diagrams showing methods of generating a depth image, in accordance with an aspect of the technology described herein.

Turning now to FIG. 7, a method 700 of generating a depth image using structured light is described, according to an aspect of the technology described herein. Method 600 can be performed by a structured light system, such as system 100 described previously.

At step 710, structured light is emitted towards a scene from a light emitter. The structured light comprises a plurality of individual emitted units forming a structured arrangement. The structured light is also modulated for making time-of-flight (TOF) depth calculations. The light emitted can be described as modulated-structured light. In this discussion, a structured light image corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). In various aspects, the number of units projected by a structured light source can be substantially smaller than the number of pixels used to represent an environment. As a result, the number of pixels illuminated by a dot, or other unit, from a structured light source can be substantially less than the total number of pixels. This can be in contrast to the light images projected by typical time-of-flight systems, where the projected illumination can correspond to continuous illumination or a "flood fill" that illuminates all or substantially all of the pixels in a view. For example, for a structured light image based on illumination from a structured light source, the number of pixels that are (at least partially) illuminated by a dot can be 60% or less of the total number of pixels in the field of view corresponding to an environment, or 50% or less, or 25% or less, or 10% or less, or possibly even 1% or less. It is further noted that in aspects where the number of dots projected in a structured light image is substantially less than the number of pixels in a corresponding field of view, the dots projected in the structured light image may have overlap with more than one pixel.

In aspects, the technology described herein outputs both a structured light and modulated light through a single light emitter. In this way, the modulated light does not flood the field, but instead follows a ratio consistent with a structured light system and each pixel may not receive modulated light. In another aspect, the system uses separate emitters to output structured light and modulated light. Reflections from the two light sources can be captured by a single imaging sensor. When two different emitters are used, frequencies need to be coordinated to differentiate the reflections from the two sources. Either way, the depth determined by TOF from the reflected modulated light can be used to assign a depth to each unit of the structured light received.

The emitter outputs structured light that is also modulated light. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

At step 720, an image of a reflection of the structured light off the scene is captured through an image sensor. The image comprises a plurality of reflected units of structured light.

The image sensor can also capture a modulation or frequency of the reflected light for use in calculating a TOF depth.

At step 725, the units in the structured light pattern are identified. Before a TOF z-depth is calculated for each unit, the units may first be identified within the image. As mentioned, the light is emitted in a pattern. A first step can be to isolate light by frequency to focus the analysis on content within a frequency corresponding to the emitted light. Even within the relevant light frequency, the image can include noise and other content that are not dots. Units, described as dots herein, can be identified by obtaining a binary segmentation of the image such that each pixel is classified as (1) covering a dot or (2) not covering a dot. A pixel covering a dot can also be referred to as a pixel associated with a dot. This can also include determining an intensity profile based on the intensities for each detected dot. With regard to detecting the presence (or absence) of a dot at a pixel, a variety of strategies can be available. One option can be to perform thresholding based on a global threshold value. If the detected intensity at a pixel is greater than the global threshold value, then the pixel is considered to be associated with a dot. Once the dots are isolated from noise in the reflected image, and therefore detected, a z-depth can be calculated.

At step 730, a TOF z-depth is calculated for a reflected unit of the structured light. For example, a TOF z-depth may be calculated for each dot. The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has travelled on the return trip between the sensor and the object. For each pixel of the image sensor, the amplitude and phase difference of the received signal relative to the transmitted light may be determined for each modulation frequency and used to calculate a depth for the pixel.

At step 740, the reflected unit is mapped to a corresponding emitted unit using x-y coordinates within the image and the TOF z-depth for the reflected unit. Dot identification or mapping attempts to identify a correspondence between detected dots in the image with projected dots. In an aspect, each unit in the projected image is assigned a unique identification corresponding to an identified unit in the projected image. The TOF z-depth is used to assign a corresponding identity to each observed dot in the image.

In one aspect, the TOF z-depth is used to generate a TOF-depth adjusted image, such as shown in FIG. 6. The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

$$Y\_ADJUSTED = Y\_DOT \text{ (so this dimension doesn't change)}$$

$$X\_ADJUSTED = X\_DOT - c/Z\_DOT\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and light emitter in a top-to-bottom arrangement along the y-axis, in which case the X_ADJUSTED=X_DOT and Y_ADJUSTED=Y_DOT−c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity.

This process can be repeated for each dot or unit detected, until each unit is repositioned to form the TOF-adjusted structured light image. The TOF-adjusted structured light image can then be used to identify each detected unit in the captured image. It should be noted that the TOF-adjusted structured light image is not used to calculate the structured light z-depth. Instead, the actual image is used since the actual x-y coordinates of the reflected light are needed to calculate the correct structured light z-depth. The TOF-adjusted structured light image is simply used to correctly identify each unit or dot in the image. A correlation can be maintained between dots in the original captured image and the TOF-adjusted structured light image, which is a virtual image.

At step 750, a structured light z-depth is calculated for the reflected unit using the x-y coordinates for the reflected unit through a triangulation algorithm. A depth map can be determined based on a structured light image by, for example, triangulation. A known distance relationship between the structured light source and a single camera for capturing the structured light image can be used. The distance can be measured between an identified dot in the image and its corresponding projected dot. The known offset between the structured light source and the camera can be used in combination with a predetermined reference pattern projected by the structured light source to allow the light source to be used as a "virtual camera" for purposes of triangulation.

At step 760, the structured light z-depth for the reflected unit is used to build a depth image of the scene. The depth image may comprise a number of pixels with a depth value. The depth value for a pixel corresponds with a distance between a point on an object in the area being viewed by the depth camera and a reference position. Where structured light units correspond to a pixel, the pixel can be assigned the depth of the structured light unit. Pixels that do not correspond to a structured light unit can be assigned a depth by extrapolating from nearby pixels. Alternatively, some pixels may not be assigned a depth. The depth image can be output for display or communicated to a device that makes use of the depth image, such as a video game device, augmented reality glasses, automated equipment (e.g., robots or cars) or other equipment.

As mentioned previously, the TOF depth and the structured light depth for each unit can be used to calculate a unit-specific confidence factor and/or an image-based confidence factor.

Figure 8:
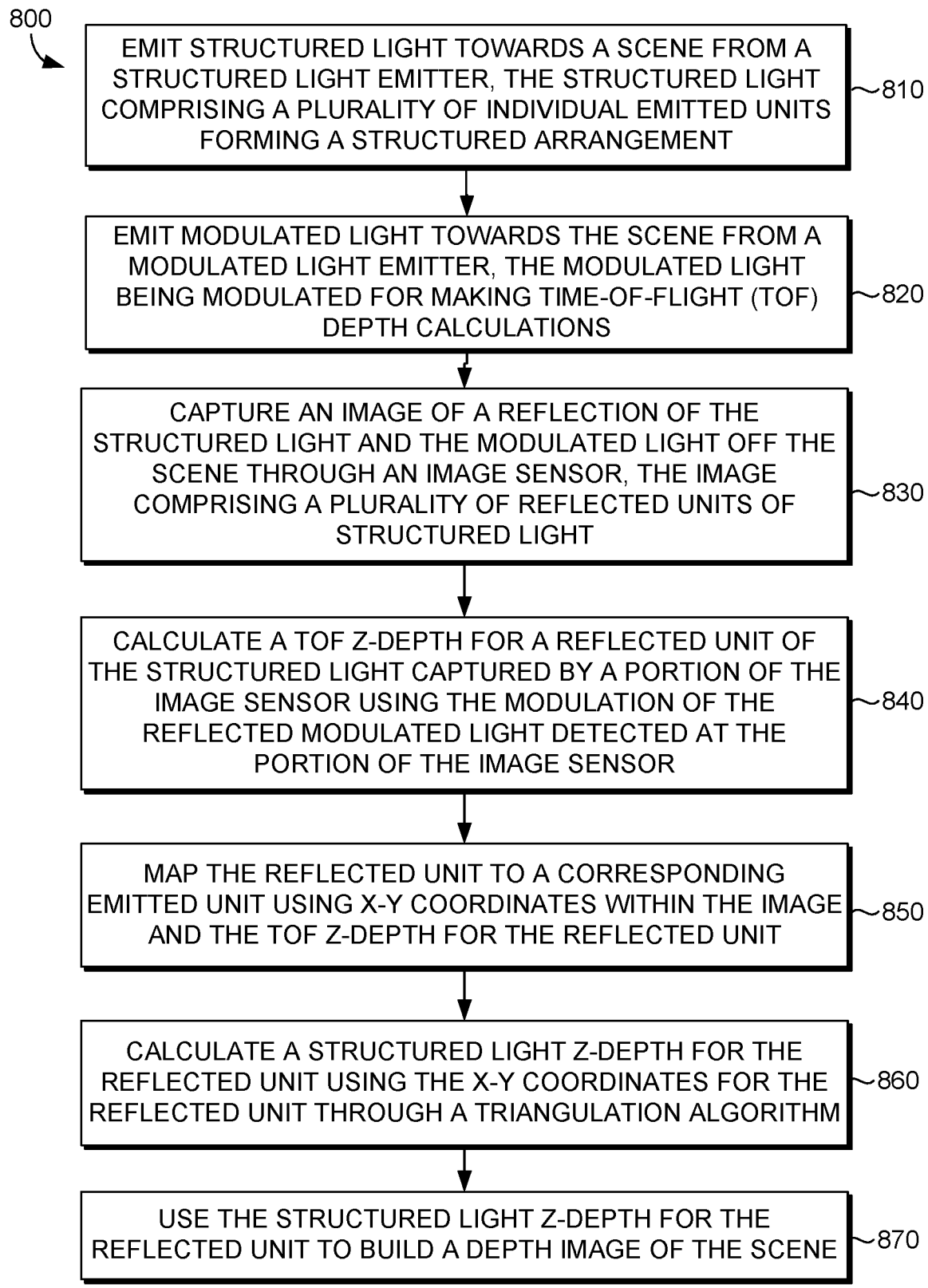

Turning now to FIG. 8, a method 800 of generating a depth image using structured light is described, according to an aspect of the technology described herein. Method 800 can be performed by a structured light system, such as system 100 described previously.

At step 810, structured light is emitted towards a scene from a structured light emitter. The structured light comprises a plurality of individual emitted units forming a structured arrangement. In this discussion, a structured light image corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). In various aspects, the number of units projected by a structured light source can be substantially smaller than the number of pixels used to represent an environment. As a result, the number of pixels illuminated by a dot, or other unit, from a structured light source can be substantially less than the total number of pixels.

At step 820, modulated light is emitted towards the scene from a modulated light emitter. The modulated light is modulated for making time-of-flight (TOF) depth calculations. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

At step 830, an image of a reflection of the structured light and the modulated light off the scene is captured through an image sensor. The image comprises a plurality of reflected units of structured light. The system uses separate emitters to output structured light and modulated light. Reflections from the two light sources can be captured by a single imaging sensor. When two different emitters are used, frequencies need to be coordinated to differentiate the reflections from the two sources.

At step 840, a TOF z-depth for a reflected unit of the structured light captured by a portion of the image sensor is calculated using the modulation of the reflected modulated light detected at the portion of the image sensor. The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has travelled on the return trip between the sensor and the object. For each pixel of the image sensor, the amplitude and phase difference of the received signal relative to the transmitted light may be determined for each modulation frequency and used to calculate a depth for the pixel.

At step 850, the reflected unit is mapped to a corresponding emitted unit using x-y coordinates within the image and the TOF z-depth for the reflected unit. Dot identification or mapping attempts to identify a correspondence between detected dots in the image with projected dots. In an aspect, each unit in the projected image is assigned a unique identification corresponding to an identified unit in the projected image. The TOF z-depth is used to assign a corresponding identity to each observed dot in the image.

In one aspect, the TOF z-depth is used to generate a TOF-depth adjusted image, such as shown in FIG. 6. The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

$$Y\_ADJUSTED = Y\_DOT \text{ (so this dimension doesn't change)}$$

$$X\_ADJUSTED = X\_DOT - c/Z\_DOT\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and light emitter in a top-to-bottom arrangement along the y-axis, in which case the X_ADJUSTED=X_DOT and Y_ADJUSTED=Y_DOT−c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity.

This process can be repeated for each dot or unit detected, until each unit is repositioned to form the TOF-adjusted structured light image. The TOF-adjusted structured light image can then be used to identify each detected unit in the captured image. It should be noted that the TOF-adjusted structured light image is not used to calculate the structured light z-depth. Instead, the actual image is used since the actual x-y coordinates of the reflected light are needed to calculate the correct structured light z-depth. The TOF-adjusted structured light image is simply used to correctly identify each unit or dot in the image. A correlation can be maintained between dots in the original captured image and the TOF-adjusted structured light image, which is a virtual image.

At step 860, a structured light z-depth is calculated for the reflected unit using the x-y coordinates for the reflected unit through a triangulation algorithm. A depth map can be determined based on a structured light image by, for example, triangulation. A known distance relationship between the structured light source and a single camera for capturing the structured light image can be used. The distance can be measured between an identified dot in the image and its corresponding projected dot. The known offset between the structured light source and the camera can be used in combination with a predetermined reference pattern projected by the structured light source to allow the light source to be used as a "virtual camera" for purposes of triangulation.

At step 870, the structured light z-depth for the reflected unit is used to build a depth image of the scene. The depth image may comprise a number of pixels with a depth value. The depth value for a pixel corresponds with a distance between a point on an object in the area being viewed by the depth camera and a reference position. Where structured light units correspond to a pixel, the pixel can be assigned the depth of the structured light unit. Pixels that do not correspond to a structured light unit can be assigned a depth by extrapolating from nearby pixels. Alternatively, some pixels may not be assigned a depth. The depth image can be output for display or communicated to a device that makes use of the depth image, such as a video game device, augmented reality glasses, automated equipment (e.g., robots or cars) or other equipment.

Exemplary Operating Environment

Figure 9:
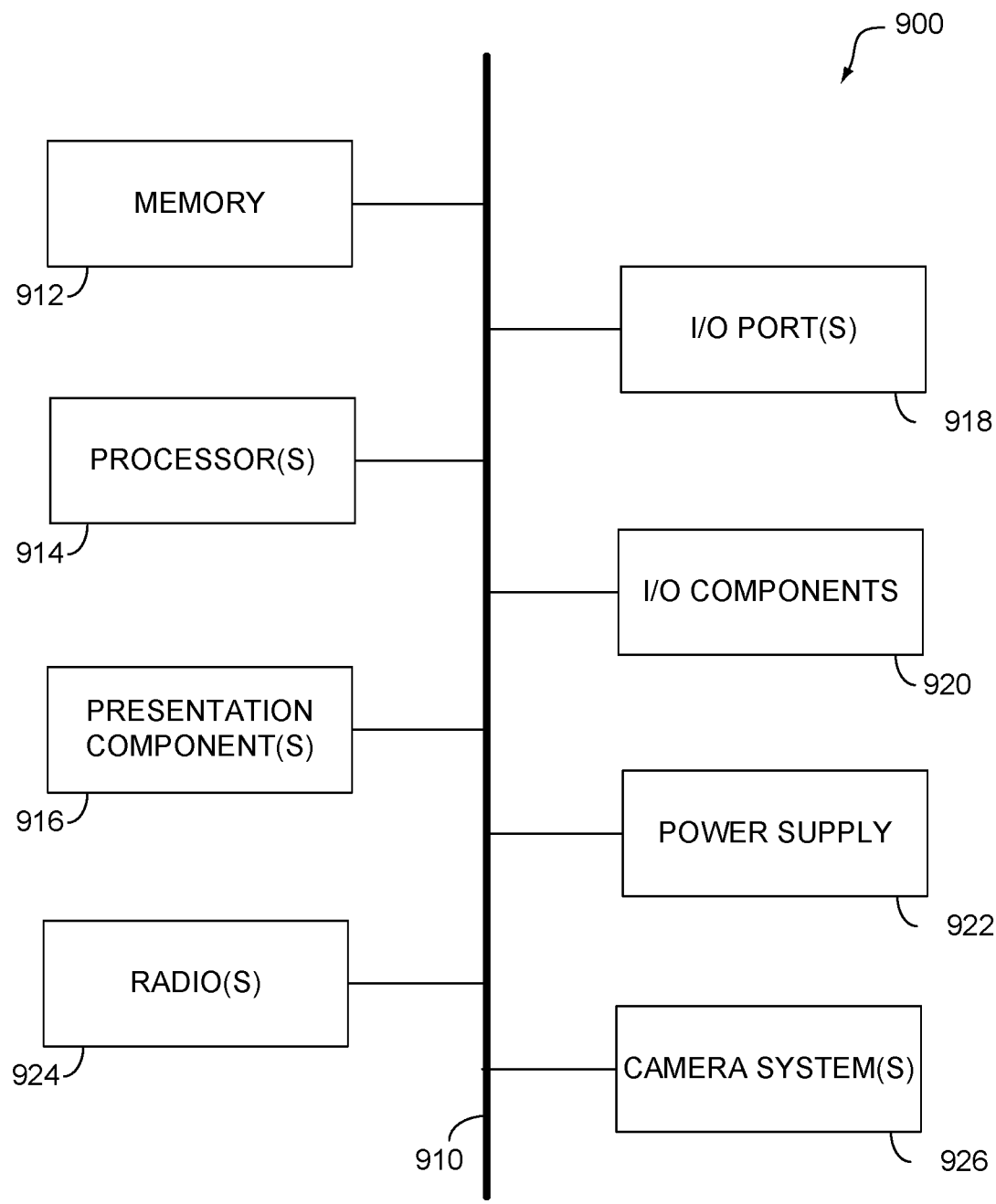
FIG. 9 is a block diagram of an exemplary computing environment suitable for use in implementing aspects of the technology described herein.

Referring to the drawings in general, and initially to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O ports 918 allow computing device 900 to be logically coupled to other devices, including I/O components 920, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 900. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with camera systems 926. The camera system 926 can include depth cameras, such as stereoscopic camera systems, infrared camera systems, RGB camera systems, structured light camera systems, TOF camera systems, and combinations of these, for generating depth images. The depth images can be used in gesture detection and recognition, displayed to a user, or used to generate augmented reality, virtual reality, or other imagery. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include a radio 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The computing device 900 can take the form of an augmented reality device. One potential application for the depth image produced by the technology described herein can be for determining a mesh representation of an environment for an augmented reality device. An augmented reality device can support the presentation of augmented reality (and/or mixed-reality) images. Augmented reality images include augmented reality objects, which are virtualized objects or entities (e.g., holographic content or mixed-reality content), that are rendered for a user associated with the augmented reality device. In some aspects, free space input detected by an augmented reality device can also be used to control the device and/or interact with the environment. For example, one or more objects in an augmented reality image can be rendered based on a real world environment, where the real world environment can be captured in a digital representation by the augmented reality device. Understanding the real world environment can be based on several different techniques that provide the augmented reality device with information about the environment. This can include scanning an environment in real time and generating a mesh representation of the environment to provide the augmented reality device with information about the environment. Augmented reality devices can include head-mounted devices.

If a depth map of the environment is available, the mesh representation can also be used to display an augmented reality image to a user that appears to incorporate the scanned environment. This can allow, for example, a user to navigate through a real world environment based on augmented reality objects and/or to view augmented reality objects in combination with the real world environment. Additionally or alternatively, this can allow an augmented reality device to detect user movements in the environment in order to convert the user movements into inputs for controlling the augmented reality device (e.g., gesture detection).

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A method of generating a depth image using structured light, comprising:
    emitting structured light towards a scene from a light emitter, the structured light comprising a plurality of individual emitted units forming a structured arrangement, the structured light also being modulated for making time-of-flight (TOF) depth calculations;
    capturing an image of a reflection of the structured light off the scene through an image sensor, the image comprising a plurality of reflected units of structured light;
    calculating a TOF z-depth for a reflected unit of the structured light;
    calculating x-y coordinates of origin for a corresponding emitted unit of structured light by mapping the reflected unit of structured light to the corresponding emitted unit using x-y coordinates within the image and the TOF z-depth for the reflected unit;
    calculating a structured light z-depth for the reflected unit using the x-y coordinates for the reflected unit and the x-y coordinates of origin through a triangulation algorithm; and
    using the structured light z-depth for the reflected unit to build a depth image of the scene.

2. The method of claim 1, wherein the unit is a dot.

3. The method of claim 1, wherein the structured arrangement is a repeating pattern.

4. The method of claim 1, further comprising calculating a confidence factor for the reflected unit by comparing the structured light z-depth for the reflected unit to the TOF z-depth for the unit.

5. The method of claim 4, further comprising calculating a confidence score for the depth image by combining the confidence factor for the reflected unit with confidence scores calculated for other reflected units.

6. The method of claim 5, further comprising outputting an error message when the confidence score is within a range associated with inaccuracy.

7. The method of claim 1, wherein emitted structured light is in the infrared spectrum.

8. The method of claim 1, wherein the structured arrangement is not randomized.

9. The method of claim 1, wherein the structured light depth image is further denoised or enhanced using the TOF range data to improve image quality.

10. The method of claim 1, wherein the image sensor is part of a camera on a mobile computing device.

11. A structured light system comprising a single light emitter configured to emit modulated light having a structured light pattern and a single light sensor that captures an image of reflected modulated light, wherein the structured light system is configured to calculate x-y coordinates of origin for a corresponding emitted unit of structured light by mapping a reflected unit of structured light to the corresponding emitted unit using x-y coordinates within the image and a TOF z-depth for the reflected unit.

12. The structured light system of claim 11, wherein the structured light system is configured to calculate a TOF z-depth for a structured light unit in the image.

13. The structured light system of claim 11, wherein the structured light system is configured to calculate a structured light z-depth for the unit.

14. The structured light system of claim 11, wherein the structured light system is configured to calculate a confidence factor of the unit using the TOF z-depth of the unit and the structured light z-depth for the unit.

15. The structured light system of claim 11, wherein the structured light is configured to generate TOF depth adjusted x-y coordinates for the structured light unit.

16. A method of generating a depth image using structured light comprising:

emitting structured light towards a scene from a structured light emitter, the structured light comprising a plurality of individual emitted units forming a structured arrangement;

emitting modulated light towards the scene from a modulated light emitter, the modulated light being modulated for making time-of-flight (TOF) depth calculations;

capturing an image of a reflection of the structured light and the modulated light off the scene through an image sensor, the image comprising a plurality of reflected units of structured light;

calculating a TOF z-depth for a reflected unit of the structured light captured by a portion of the image sensor using the modulation of the reflected modulated light detected at the portion of the image sensor;

calculating x-y coordinates of origin for a corresponding emitted unit of structured light by mapping the reflected unit of structured light to the corresponding emitted unit of structured light using x-y coordinates within the image and the TOF z-depth for the reflected unit;

calculating a structured light z-depth for the reflected unit using the x-y coordinates within the image for the reflected unit and the x-y coordinates of origin through a triangulation algorithm; and using the structured light z-depth for the reflected unit to build a depth image of the scene.

17. The method of claim 16, further comprising calculating a confidence factor for the reflected unit by comparing the structured light z-depth for the reflected unit to the TOF z-depth for the unit.

18. The method of claim 17, further comprising calculating a confidence score for the depth image by combining the confidence factor for the reflected unit with confidence scores calculated for other reflected units.

19. The method of claim 16, wherein the unit is a dot.

20. The method of claim 16, wherein the structured arrangement is not randomized.

* * * * *